US008706490B2

(12) United States Patent  
Cross et al.

(10) Patent No.: US 8,706,490 B2  
(45) Date of Patent: *Apr. 22, 2014

(54) INDEXING DIGITIZED SPEECH WITH WORDS REPRESENTED IN THE DIGITIZED SPEECH

(71) Applicant: Nuance Communications, Inc., Burlington, MA (US)

(72) Inventors: Charles W. Cross, Wellington, FL (US); Frank L. Jania, Chapel Hill, NC (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,792

(22) Filed: Aug. 7, 2013

(65) Prior Publication Data

US 2014/0039899 A1 Feb. 6, 2014

Related U.S. Application Data

(63) Continuation of application No. 11/688,331, filed on Mar. 20, 2007, now Pat. No. 8,515,757.

(51) Int. Cl.
*G10L 15/22* (2006.01)
*G10L 15/19* (2013.01)
*G10L 15/193* (2013.01)

(52) U.S. Cl.
CPC ............. *G10L 15/19* (2013.01); *G10L 15/193* (2013.01); *G01L 15/197* (2013.01); *G01L 15/183* (2013.01)
USPC ............ 704/251; 704/253; 704/275; 704/278

(58) Field of Classification Search
CPC ...... G10L 15/183; G10L 15/187; G10L 15/19; G10L 15/193; G10L 15/197
USPC .................... 704/248, 251, 253, 270
See application file for complete search history.

(56) References Cited

U.S. PATENT DOCUMENTS 5,577,165 A 11/1996 Takebayashi et al.
5,584,052 A 12/1996 Gulau et al.
(Continued)

FOREIGN PATENT DOCUMENTS

CN 1385783 A 12/2002
CN 1564123 A 1/2005
(Continued)

OTHER PUBLICATIONS

Audacity user manual, [online], http://audacity.sourceforge.net , release 1.2, releasing date Mar. 1, 2004.

(Continued)

*Primary Examiner* — Jialong He
(74) *Attorney, Agent, or Firm* — Wolf, Greenfield & Sacks, P.C.

(57) ABSTRACT

Indexing digitized speech with words represented in the digitized speech, with a multimodal digital audio editor operating on a multimodal device supporting modes of user interaction, the modes of user interaction including a voice mode and one or more non-voice modes, the multimodal digital audio editor operatively coupled to an ASR engine, including providing by the multimodal digital audio editor to the ASR engine digitized speech for recognition; receiving in the multimodal digital audio editor from the ASR engine recognized user speech including a recognized word, also including information indicating where, in the digitized speech, representation of the recognized word begins; and inserting by the multimodal digital audio editor the recognized word, in association with the information indicating where, in the digitized speech, representation of the recognized word begins, into a speech recognition grammar, the speech recognition grammar voice enabling user interface commands of the multimodal digital audio editor.

18 Claims, 9 Drawing Sheets

(56) References Cited

U.S. PATENT DOCUMENTS

| | | |
|---|---|---|
| 5,649,060 A | 7/1997 | Ellozy et al. |
| 5,774,628 A | 6/1998 | Hemphill |
| 5,875,429 A | 2/1999 | Douglas |
| 5,875,448 A | 2/1999 | Boys et al. |
| 5,960,447 A | 9/1999 | Holt et al. |
| 5,969,717 A | 10/1999 | Ikemoto |
| 6,208,972 B1 | 3/2001 | Grant et al. |
| 6,243,375 B1 | 6/2001 | Speicher |
| 6,275,806 B1 | 8/2001 | Pertrushin |
| 6,301,560 B1 | 10/2001 | Masters |
| 6,513,011 B1 | 1/2003 | Uwakubo |
| 6,606,599 B2 | 8/2003 | Grant et al. |
| 6,728,682 B2 | 4/2004 | Fasciano |
| 6,856,960 B1 | 2/2005 | Dragosh et al. |
| 6,920,425 B1 | 7/2005 | Will et al. |
| 6,999,930 B1 | 2/2006 | Roberts et al. |
| 7,035,805 B1 | 4/2006 | Miller |
| 7,171,243 B2 | 1/2007 | Watanabe et al. |
| 7,188,067 B2 | 3/2007 | Grant et al. |
| 7,330,890 B1 | 2/2008 | Partovi et al. |
| 7,356,472 B2 | 4/2008 | Cross et al. |
| 7,376,586 B1 | 5/2008 | Partovi et al. |
| 7,401,337 B2 | 7/2008 | Bou-Ghannam et al. |
| 7,409,690 B2 | 8/2008 | Bou-Ghannam et al. |
| 7,487,085 B2 | 2/2009 | Ativanichayaphong et al. |
| 7,509,260 B2 | 3/2009 | Cross, Jr. et al. |
| 7,509,659 B2 | 3/2009 | McArdle |
| 7,548,977 B2 | 6/2009 | Agapi et al. |
| 7,650,284 B2 | 1/2010 | Cross et al. |
| 7,739,117 B2 | 6/2010 | Ativanichayaphong et al. |
| 7,925,512 B2 | 4/2011 | Cross, Jr. et al. |
| 7,966,188 B2 | 6/2011 | Ativanichayaphong et al. |
| 8,024,194 B2 | 9/2011 | Cross, Jr. et al. |
| 8,082,148 B2 | 12/2011 | Agapi et al. |
| 8,121,837 B2 | 2/2012 | Agapi et al. |
| 8,214,242 B2 | 7/2012 | Agapi et al. |
| 8,229,081 B2 | 7/2012 | Agapi et al. |
| 2002/0009172 A1 | 1/2002 | Cornog et al. |
| 2002/0065944 A1 | 5/2002 | Hickey et al. |
| 2002/0092019 A1 | 7/2002 | Marcus |
| 2002/0095290 A1 | 7/2002 | Kahn et al. |
| 2002/0099553 A1 | 7/2002 | Brittan et al. |
| 2002/0120554 A1 | 8/2002 | Vega |
| 2002/0129057 A1 | 9/2002 | Spielberg |
| 2002/0143533 A1 | 10/2002 | Lucas et al. |
| 2002/0147593 A1 | 10/2002 | Lewis et al. |
| 2002/0184610 A1 | 12/2002 | Chong et al. |
| 2003/0039341 A1 | 2/2003 | Burg et al. |
| 2003/0046316 A1 | 3/2003 | Gergic et al. |
| 2003/0046346 A1 | 3/2003 | Mumick et al. |
| 2003/0101451 A1 | 5/2003 | Bentolila et al. |
| 2003/0125945 A1 | 7/2003 | Doyle |
| 2003/0179865 A1 | 9/2003 | Stillman et al. |
| 2003/0182622 A1 | 9/2003 | Sibal et al. |
| 2003/0195739 A1 | 10/2003 | Washio |
| 2003/0217161 A1 | 11/2003 | Balasuriya |
| 2003/0229900 A1 | 12/2003 | Reisman |
| 2003/0235282 A1 | 12/2003 | Sichelman et al. |
| 2004/0019487 A1 | 1/2004 | Kleindienst et al. |
| 2004/0025115 A1 | 2/2004 | Sienel et al. |
| 2004/0031058 A1 | 2/2004 | Reisman |
| 2004/0044516 A1 | 3/2004 | Kennewick et al. |
| 2004/0049388 A1 | 3/2004 | Roth et al. |
| 2004/0049390 A1 | 3/2004 | Brittan et al. |
| 2004/0059705 A1 | 3/2004 | Wittke et al. |
| 2004/0083109 A1 | 4/2004 | Halonen et al. |
| 2004/0120472 A1 | 6/2004 | Popay et al. |
| 2004/0120476 A1 | 6/2004 | Harrison et al. |
| 2004/0138890 A1 | 7/2004 | Ferrans et al. |
| 2004/0153323 A1 | 8/2004 | Charney et al. |
| 2004/0179038 A1 | 9/2004 | Blattner et al. |
| 2004/0216036 A1 | 10/2004 | Chu et al. |
| 2004/0236574 A1 | 11/2004 | Ativanichayaphong et al. |
| 2004/0260562 A1 | 12/2004 | Kujirai |
| 2005/0042591 A1 | 2/2005 | Bloom et al. |
| 2005/0075884 A1 | 4/2005 | Badt |
| 2005/0091059 A1 | 4/2005 | Lecoeuche |
| 2005/0131559 A1 | 6/2005 | Kahn et al. |
| 2005/0131701 A1 | 6/2005 | Cross et al. |
| 2005/0138219 A1 | 6/2005 | Bou-Ghannam et al. |
| 2005/0138647 A1 | 6/2005 | Bou-ghannam et al. |
| 2005/0154580 A1 | 7/2005 | Horowitz et al. |
| 2005/0159948 A1 | 7/2005 | Roth et al. |
| 2005/0160461 A1 | 7/2005 | Baumgartner et al. |
| 2005/0188412 A1 | 8/2005 | Dacosta |
| 2005/0203729 A1 | 9/2005 | Roth et al. |
| 2005/0203747 A1 | 9/2005 | Lecoeuche |
| 2005/0261908 A1 | 11/2005 | Cross et al. |
| 2005/0273769 A1 | 12/2005 | Eichenberger et al. |
| 2005/0283367 A1 | 12/2005 | Ativanichayaphong et al. |
| 2006/0047510 A1 | 3/2006 | Ativanichayaphong et al. |
| 2006/0064302 A1 | 3/2006 | Ativanichayaphong et al. |
| 2006/0069564 A1 | 3/2006 | Allison et al. |
| 2006/0074680 A1 | 4/2006 | Cross et al. |
| 2006/0075120 A1 | 4/2006 | Smit |
| 2006/0111906 A1 | 5/2006 | Cross et al. |
| 2006/0122836 A1 | 6/2006 | Cross et al. |
| 2006/0123358 A1 | 6/2006 | Lee et al. |
| 2006/0136222 A1 | 6/2006 | Cross et al. |
| 2006/0146728 A1 | 7/2006 | Engelsma et al. |
| 2006/0168095 A1 | 7/2006 | Sharma et al. |
| 2006/0168595 A1 | 7/2006 | McArdle |
| 2006/0184626 A1 | 8/2006 | Agapi et al. |
| 2006/0190264 A1 | 8/2006 | Jaramillo et al. |
| 2006/0218039 A1 | 9/2006 | Johnson |
| 2006/0229880 A1 | 10/2006 | White et al. |
| 2006/0235694 A1 | 10/2006 | Cross et al. |
| 2006/0287845 A1 | 12/2006 | Cross et al. |
| 2006/0287865 A1 | 12/2006 | Cross et al. |
| 2006/0287866 A1 | 12/2006 | Cross et al. |
| 2006/0288309 A1 | 12/2006 | Cross et al. |
| 2007/0265851 A1 | 11/2007 | Ben-David et al. |
| 2007/0274296 A1 | 11/2007 | Cross et al. |
| 2007/0274297 A1 | 11/2007 | Cross et al. |
| 2007/0288241 A1 | 12/2007 | Cross et al. |
| 2007/0294084 A1 | 12/2007 | Cross et al. |
| 2008/0065386 A1 | 3/2008 | Cross et al. |
| 2008/0065387 A1 | 3/2008 | Cross, Jr. et al. |
| 2008/0065388 A1 | 3/2008 | Cross et al. |
| 2008/0065389 A1 | 3/2008 | Cross et al. |
| 2008/0065390 A1 | 3/2008 | Ativanichayaphong et al. |
| 2008/0086564 A1 | 4/2008 | Putman et al. |
| 2008/0140410 A1 | 6/2008 | Ativanichayaphong et al. |
| 2008/0162136 A1 | 7/2008 | Agapi et al. |
| 2008/0177530 A1 | 7/2008 | Cross et al. |
| 2008/0195393 A1 | 8/2008 | Cross et al. |
| 2008/0208584 A1 | 8/2008 | Ativanichayaphong et al. |
| 2008/0208585 A1 | 8/2008 | Ativanichayaphong et al. |
| 2008/0208586 A1 | 8/2008 | Ativanichayaphong et al. |
| 2008/0208587 A1 | 8/2008 | Ben-David et al. |
| 2008/0208588 A1 | 8/2008 | Ativanichayaphong et al. |
| 2008/0208589 A1 | 8/2008 | Cross et al. |
| 2008/0208590 A1 | 8/2008 | Cross et al. |
| 2008/0208591 A1 | 8/2008 | Ativanichayaphong et al. |
| 2008/0208592 A1 | 8/2008 | Cross et al. |
| 2008/0208593 A1 | 8/2008 | Ativanichayaphong et al. |
| 2008/0208594 A1 | 8/2008 | Cross et al. |
| 2008/0228494 A1 | 9/2008 | Cross |
| 2008/0228495 A1 | 9/2008 | Cross, Jr. et al. |
| 2008/0235021 A1 | 9/2008 | Cross et al. |
| 2008/0235022 A1 | 9/2008 | Bergl et al. |
| 2008/0235027 A1 | 9/2008 | Cross |
| 2008/0235029 A1 | 9/2008 | Cross et al. |
| 2008/0249782 A1 | 10/2008 | Ativanichayaphong et al. |
| 2008/0255850 A1 | 10/2008 | Cross et al. |
| 2008/0255851 A1 | 10/2008 | Ativanichayaphong et al. |
| 2009/0268883 A1 | 10/2009 | Agapi et al. |
| 2009/0271188 A1 | 10/2009 | Agapi et al. |
| 2009/0271189 A1 | 10/2009 | Agapi et al. |

(56) References Cited

U.S. PATENT DOCUMENTS

2009/0271199 A1  10/2009  Agapi et al.
2009/0271438 A1  10/2009  Agapi et al.

FOREIGN PATENT DOCUMENTS

| EP | 0 794 670 A2 | 9/1997 |
|---|---|---|
| EP | 1 450 350 A1 | 8/2004 |
| GB | 0507148.5 | 4/2005 |
| JP | 2000155529 A | 6/2000 |
| JP | 2003140672 A | 5/2003 |
| WO | WO 99/48088 A1 | 9/1999 |
| WO | WO 00/51106 A1 | 8/2000 |
| WO | WO 02/32140 A2 | 4/2002 |
| WO | WO 2004/062945 A2 | 7/2004 |
| WO | WO 2006/108795 A1 | 10/2006 |

OTHER PUBLICATIONS

Axelsson, et al.; "XFITML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

Didier Guillevic, et al., Robust Semantic Confidence Scoring ICSLP 2002: 7th International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

Gauvain et al. "Transcribing broadcast news for audio and video indexing", Communication of the ACM, Feb. 2000.

Nuance Speech Recognition System, Version 8.0, "Grammar Developer's Guide", Nuance Communications, Inc., 2001.

PCT Search Report, Jun. 18, 2008; PCT Application No. ; PCT/EP2008/051363.

PCT Search Report, Jun. 25, 2008; PCT Application No. ; PCT/EP2008/051358.

Taiwanese Office Action for TW Application No. 097107352 mailed Apr. 17, 2013.

Chinese Office Action for CN Application No. 101271689 mailed Jun. 3, 2010.

Chinese Office Action for CN Application No. 101271689 mailed Dec. 16, 2010.

Chinese Office Action for CN Application No. 101271689 mailed Mar. 18, 2011.

Chinese Office Action for CN Application No. 101271689 mailed Jul. 29, 2011.

Chinese Office Action for CN Application No. 101271689 mailed Oct. 31, 2011.

W3C: "Voice Extensible Markup Language (VoiceXML) 2.1, W3C Candidate Recommendation Jun. 13, 2005" Internet, [Online] Jun. 13, 2005, pp. 1-34, XP002484189 Retrieved from the Internet: URL:http://www.w3.orgaR/2005/CR-voicexml21-20050613/ [retrieved on Jun. 2008-121.

W3C: "Voice Extensible Markup Language (VoiceXML) Version 2.0" Internet Citation, [Online] XP002248286 Retrieved from the Internet: URL:http://www.w3.orgITR/voicexml20 [retrieved on Jul. 18, 2003].

INDEXING DIGITIZED SPEECH WITH WORDS REPRESENTED IN THE DIGITIZED SPEECH

RELATED APPLICATIONS

This application is a continuation of co-pending U.S. application Ser. No. 11/688,331, entitled "INDEXING DIGITIZED SPEECH WITH WORDS REPRESENTED IN THE DIGITIZED SPEECH," filed on Mar. 20, 2007, which is herein incorporated by reference in its entirety.

BACKGROUND OF THE INVENTION

1. Field of the Invention

The field of the invention is data processing, or, more specifically, methods, apparatus, and products for indexing digitized speech.

2. Description of Related Art

User interaction with applications running on devices through a keyboard or stylus has become increasingly limited and cumbersome as those devices have become increasingly smaller, more mobile, and more complex. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using an automated device easier.

Analyzing audio data with a digital audio editor is tedious if one is analyzing human speech and interested in the location of words in the audio data. Multimodal digital audio editors, including multimodal digital audio editors, may be formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal digital audio editor often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal digital audio editors also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal digital audio editors, SALT does not provide a standard visual markup language or eventing model. Rather, it is a low-level set of tags for specifying voice interaction that can be embedded into other environments. In addition to X+V and SALT, multimodal digital audio editors may be implemented in Java™ with a Java speech framework, in C++, for example, and with other technologies and in other environments as well.

Current lightweight voice solutions require a developer to build a grammar and lexicon to limit the potential number of words that an automated speech recognition ('ASR') engine must recognize-as a means for increasing accuracy. Pervasive devices have limited interaction and input modalities due to the form factor of the device, and kiosk devices have limited interaction and input modalities by design. In both cases the use of speaker independent voice recognition is implemented to enhance the user experience and interaction with the device. The state of the art in speaker independent recognition allows for some sophisticated voice applications to be written as long as there is a limited vocabulary associated with each potential voice command. For example, if the user is prompted to speak the name of a city the system can, with a good level of confidence, recognize the name of the city spoken.

SUMMARY OF THE INVENTION

Methods, apparatus, and computer program products are described for indexing digitized speech with words represented in the digitized speech, implemented with a multimodal digital audio editor operating on a multimodal device supporting multiple modes of user interaction with the multimodal digital audio editor, the modes of user interaction including a voice mode and one or more non-voice modes, the multimodal digital audio editor operatively coupled to an ASR engine, including providing by the multimodal digital audio editor to the ASR engine digitized speech for recognition; receiving in the multimodal digital audio editor from the ASR engine recognized user speech including a recognized word, also including information indicating where, in the digitized speech, representation of the recognized word begins; and inserting by the multimodal digital audio editor the recognized word, in association with the information indicating where, in the digitized speech, representation of the recognized word begins, into a speech recognition grammar, the speech recognition grammar voice enabling user interface commands of the multimodal digital audio editor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
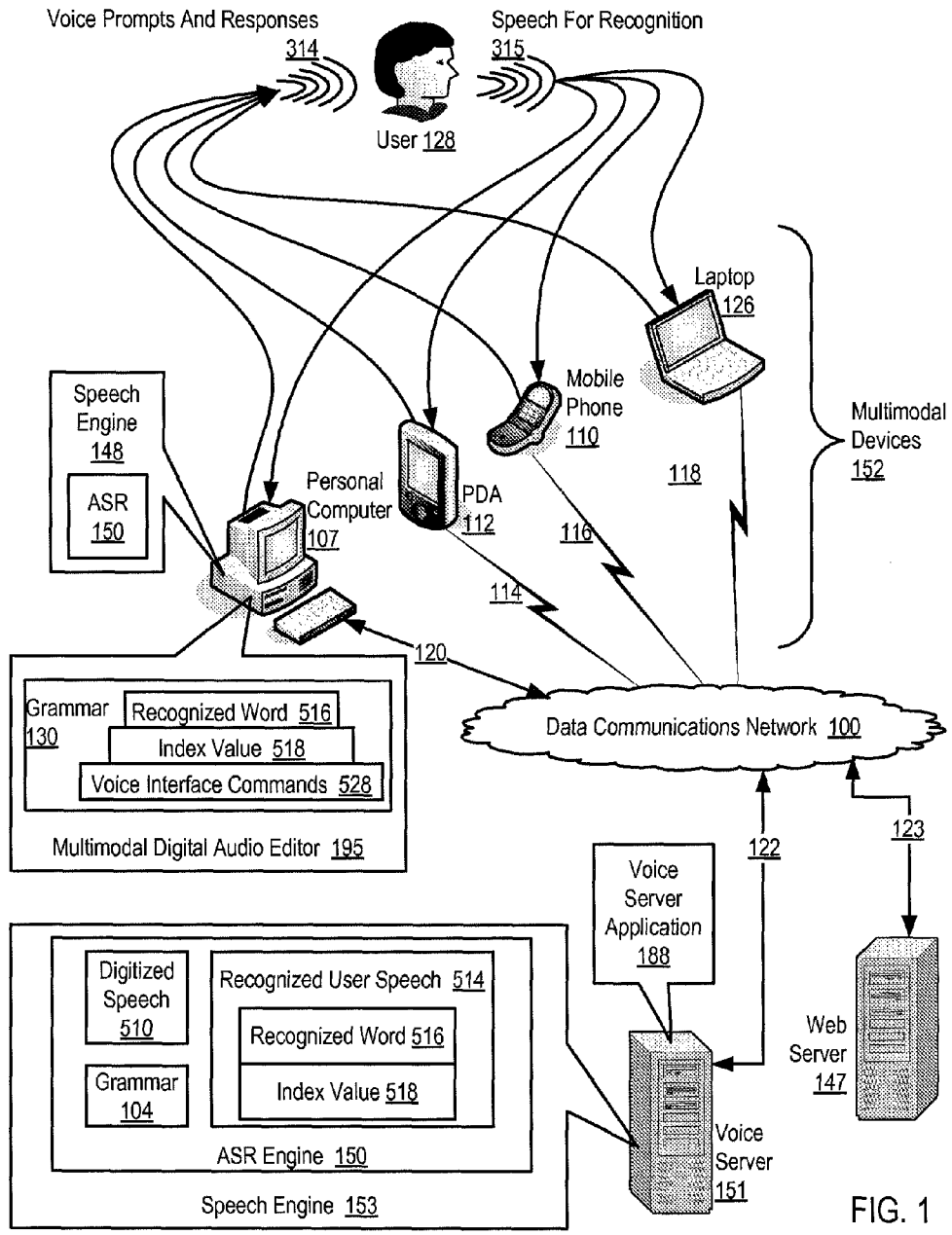
FIG. 1 sets forth a network diagram illustrating an exemplary system for indexing digitized speech according to embodiments of the present invention.

Exemplary methods, apparatus, and products for indexing digitized speech according to embodiments of the present invention are described with reference to the accompanying drawings, beginning with FIG. 1. FIG. 1 sets forth a network diagram illustrating an exemplary system for indexing digitized speech according to embodiments of the present invention. Indexing digitized speech in this example is implemented with a multimodal digital audio editor (195) operating on a multimodal device (152). A multimodal digital audio editor is a computer application for audio editing, that is, for manipulating digital audio. The digital audio so edited in multimodal digital audio editors according to embodiments of the present application is referred to generally in this specification as 'digitized speech.' A typical multimodal digital audio editor according to embodiments of the present invention allows a user to:

Record audio signals from one or more inputs, digitize the audio signals, and store them in device memory in digital form.

Edit the digital audio, including altering the start time, stop time, and duration of any sound on an audio timeline.

Mixing multiple sound sources or tracks, combining them at various volume levels and, for stereo signals, left-right panning to one or more output tracks.

Apply simple or advanced effects or filters to change the audio. Examples of effects include compression, expansion, flanging, reverb, noise reduction, equalization, and a wide variety of other functions.

Playback the digitized, recorded sounds, often after mixing, to one or more outputs, typically speakers, additional processors, a recording medium, or a visual display.

Conversion from one audio format or codec to another, differing file formats, sound quality levels, compression ratios, and so on.

Examples of off-the-shelf digital audio editors that may be improved for operation as a multimodal digital audio editor that indexes digitized speech according to embodiments of the present invention include:

Audio Dementia™ from Holladay Audio,

Audacity™, a free digital audio editor, from a non-profit, volunteer group, distributed under the GNU GPL, Adobe Audition™ from Adobe Systems, FlexiMusic Wave Editor™ from FlexiMusic, Goldwave™ from Goldwave Inc., RiffWorks™ from Sonoma Wire Works, and Many others . . . as will occur to those of skill in the art.

A multimodal device (152) is automated computing machinery that supports multiple modes of user interaction with a multimodal digital audio editor including a voice mode and one or more non-voice modes of user interaction with the multimodal digital audio editor. The voice mode is represented here with audio output of voice prompts and responses (177) from the multimodal devices and audio input of speech for recognition (315) from a user (128). Non-voice modes are represented by input/output devices such as keyboards and display screens on the multimodal devices (152). The multimodal digital audio editor (195) is operatively coupled to an automatic speech recognition ('ASR') engine (150) in a speech engine (148). Such an operative coupling may be implemented with an application programming interface ('API'), a voice service module, or a VOIP connection as explained in more detail below.

The system of FIG. 1 operates generally to carry out indexing digitized speech according to embodiments of the present invention by providing by the multimodal digital audio editor (195) to an ASR engine (150) digitized speech for recognition. The multimodal digital audio editor (195) receives from the ASR engine (150) recognized user speech (514) including a recognized word (516). The recognized user speech from the ASR engine also includes information (518), referred to in this example as an 'index,' indicating where, in the digitized speech, representation of the recognized word begins. The multimodal digital audio editor (195) inserts the recognized word (516), in association with the information indicating where, in the digitized speech, representation of the recognized word begins, into a speech recognition grammar (130). The speech recognition grammar (130) voice enables user interface commands of the multimodal digital audio editor. Typical digital audio editors according to embodiments of the present invention also visually display the digitized speech with the recognized word as an index of where in the digitized speech the representation of the recognized word begins—as illustrated on FIG. 9 and explained in more detail below with reference to FIGS. 6 and 7.

The system of FIG. 1 includes two speech recognition grammars (130, 104). The grammar (104) is the grammar used by the ASR engine (150) in voice server (151) to recognize the recognized word that is then inserted into grammar (130) by the multimodal digital audio editor (195). Such speech recognition grammars are composed of grammar rules. Grammar rules are components of a speech recognition grammar that advise an ASR engine or a voice interpreter which words presently can be recognized. The follow grammar, for example:

```
<grammar>
   <command> = [remind me to] call | phone | telephone <name>
      <when>;
   <name> = bob | martha | joe;
   <when> = today | this afternoon;
</grammar>
``` contains tree rules named respectively <command>, <name>, and <when>. The elements <name> and <when> inside the <command> rule are references to the rules named <name> and <when>. Such rule references require that the referenced rules must be matched by an ASR engine in order for the referring rule to be matched. In this example, therefore, the <name> rule and the <when> rule must both be matched by an ASR engine with speech from a user utterance in order for the <command> rule to be matched.

A multimodal device is an automated device, that is, automated computing machinery or a computer program running on an automated device, that is capable of accepting from users more than one mode of input, keyboard, mouse, stylus, and so on, including speech input—and also displaying more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal digital audio editors may be implemented in markup languages (X+V, SALT), object-oriented languages (Java, C++), procedural languages (the C programming language), and in other kinds of computer languages as may occur to those of skill in the art, this specification uses the term 'multimodal digital audio editor' to refer to any software application for editing digital audio, server-oriented or client-oriented, thin client, thick client, stand-alone application, that administers more than one mode of user input and more than one mode of output to a user, where the modes include at least a visual mode and a speech mode.

The system of FIG. 1 includes several example multimodal devices:
  personal computer (107) which is coupled for data communications to data communications network (100) through wireline connection (120),
  personal digital assistant ('PDA') (112) which is coupled for data communications to data communications network (100) through wireless connection (114),
  mobile telephone (110) which is coupled for data communications to data communications network (100) through wireless connection (116), and
  laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal digital audio editor capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled
   RTP Payload Format for European Telecommunications Standards Institute (ETSI) European Standard ES 201 108 Distributed Speech Recognition Encoding and the Internet Draft entitled
   RTP Payload Formats for European Telecommunications Standards Institute (ETSI) European Standard ES 202 050, ES 202 211, and ES 202 212 Distributed Speech Recognition Encoding,
the IETF provides standard RTP payload formats for various codecs. It is useful to note, therefore, that there is no limitation in the present invention regarding codecs, payload formats, or packet structures. Speech for automatic speech recognition according to embodiments of the present invention may be encoded, that is, digitized, with any codec, including, for example:
  AMR (Adaptive Multi-Rate Speech coder)
  ARDOR (Adaptive Rate-Distortion Optimized sound codeR),
  Dolby Digital (A/52, AC3),
  DTS (DTS Coherent Acoustics),
  MP1 (MPEG audio layer-1),
  MP2 (MPEG audio layer-2) Layer 2 audio codec (MPEG-1, MPEG-2 and non-ISO MPEG-2.5),
  MP3 (MPEG audio layer-3) Layer 3 audio codec (MPEG-1, MPEG-2 and non-ISO MPEG-2.5),
  Perceptual Audio Coding,
  FS-1015 (LPC-10),
  FS-1016 (CELP),
  G.726 (ADPCM),
  G.728 (LD-CELP),
  G.729 (CS-ACELP),
  GSM,
  HILN (MPEG-4 Parametric audio coding), and
  others as may occur to those of skill in the art.

As mentioned, a multimodal device according to embodiments of the present invention is capable of providing digitized speech (510) to a speech engine (153) for recognition. A speech engine is a functional module, typically a software module, although it may include specialized hardware also, that does the work of recognizing and generating or 'synthesizing' human speech. The speech engine implements speech recognition by use of a further module referred to in this specification as a ASR engine, and the speech engine carries out speech synthesis by use of a further module referred to in this specification as a text-to-speech ('TTS') engine. As shown in FIG. 1, a speech engine (148) may be installed locally in the multimodal device (107) itself, or a speech engine (153) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal digital audio editing software that obtains speech recognition and speech synthesis services from a voice server located remotely across a network from the thin client. For ease of explanation, only one (107) of the multimodal devices (152) in the system of FIG. 1 is shown with a speech engine (148), but readers will recognize that any multimodal device may have a speech engine according to embodiments of the present invention.

A multimodal digital audio editor (195) that is implemented partially or entirely in X+V may provide speech for recognition and text for speech synthesis to a speech engine through a VoiceXML interpreter. A VoiceXML interpreter is a software module of computer program instructions that accepts voice dialog instructions from a multimodal digital audio editor, typically in the form of a VoiceXML <form> element. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA').

Just as a speech engine may be installed locally or remotely with respect to any particular multimodal device, so also a VoiceXML interpreter may be installed locally in the multimodal device itself, or a VoiceXML interpreter may be installed remotely with respect to the multimodal device, across a data communications network (100) in a voice server (151). In a thick client architecture, a multimodal device (152) with a multimodal digital audio editor implemented in X+V includes both its own speech engine and its own VoiceXML interpreter. The VoiceXML interpreter exposes an API to the multimodal digital audio editor for use in providing speech recognition and speech synthesis for the multimodal digital audio editor. The multimodal digital audio editor provides dialog instructions, VoiceXML <form> elements, grammars, input elements, event handlers, and so on, through the API to the VoiceXML interpreter, and the VoiceXML interpreter administers the speech engine on behalf of the multimodal digital audio editor. In a thick client architecture, VoiceXML dialogs are interpreted by a VoiceXML interpreter on the multimodal device. In a thin client architecture, VoiceXML dialogs are interpreted by a VoiceXML interpreter on a voice server (151) located remotely across a data communications network (100) from the multimodal device (107) running the multimodal digital audio editor (195).

A VoiceXML interpreter provides grammars, speech for recognition, and text prompts for speech synthesis to the speech engine, and the VoiceXML interpreter returns to the multimodal digital audio editor speech engine output in the form of recognized speech, semantic interpretation results, and digitized speech for voice prompts. In a thin client architecture, the VoiceXML interpreter is located remotely from the multimodal client device (107) in a voice server (151), the API for the VoiceXML interpreter is still implemented in the multimodal device, with the API modified to communicate voice dialog instructions, speech for recognition, and text and voice prompts to and from the VoiceXML interpreter on the voice server. Each of the example multimodal devices (152) in the system of FIG. 1 may be configured to index digitized speech by installing and running on the multimodal device a multimodal digital audio editor that indexes digitized speech with words represented in the digitized speech according to embodiments of the present invention. The use of these four example multimodal devices (152) is for explanation only, not for limitation of the invention. Any automated computing machinery capable of accepting speech from a user and providing the speech digitized to an ASR engine for recognition may be configured to function as a multimodal device for indexing digitized speech according to embodiments of the present invention.

The system of FIG. 1 also includes a voice server (151) which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal digital audio editors such as, for example, X+V applications, SALT applications, or Java voice applications.

The system of FIG. 1 includes a data communications network (100) that connects the multimodal devices (152) and the voice server (151) for data communications. A data communications network for indexing digitized speech according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol,
a data communications network layer with the Internet Protocol (In,
a transport layer with the Transmission Control Protocol ('TCP') or the User Datagram Protocol ('UDP'),
an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
other protocols as will occur to those of skill in the art.

The system of FIG. 1 includes a web server (147) connected for data communications through wireline connection (123) to network (100) and therefore to the multimodal devices (152). The web server (147) may be any server that provides to client devices markup documents that compose multimodal digital audio editors. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. The markup documents also may be implemented in any markup language that supports non-speech display elements, data entry elements, and speech elements for identifying which speech to recognize and which words to speak, grammars, form elements, and the like, including, for example, X+V and SALT. A multimodal digital audio editor in a multimodal device then, upon receiving from the web sever (147) a markup document as part of a multimodal digital audio editor, may execute speech elements by use of a VoiceXML interpreter and speech engine (148) in the multimodal device itself (107) or by use of a VoiceXML interpreter and speech engine (153) located remotely from the multimodal device in a voice server (151).

The arrangement of the multimodal devices (152), the web server (147), the voice server (151), and the data communications network (100) making up the exemplary system illustrated in FIG. 1 are for explanation, not for limitation. Data processing systems useful for indexing digitized speech according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Figure 2:
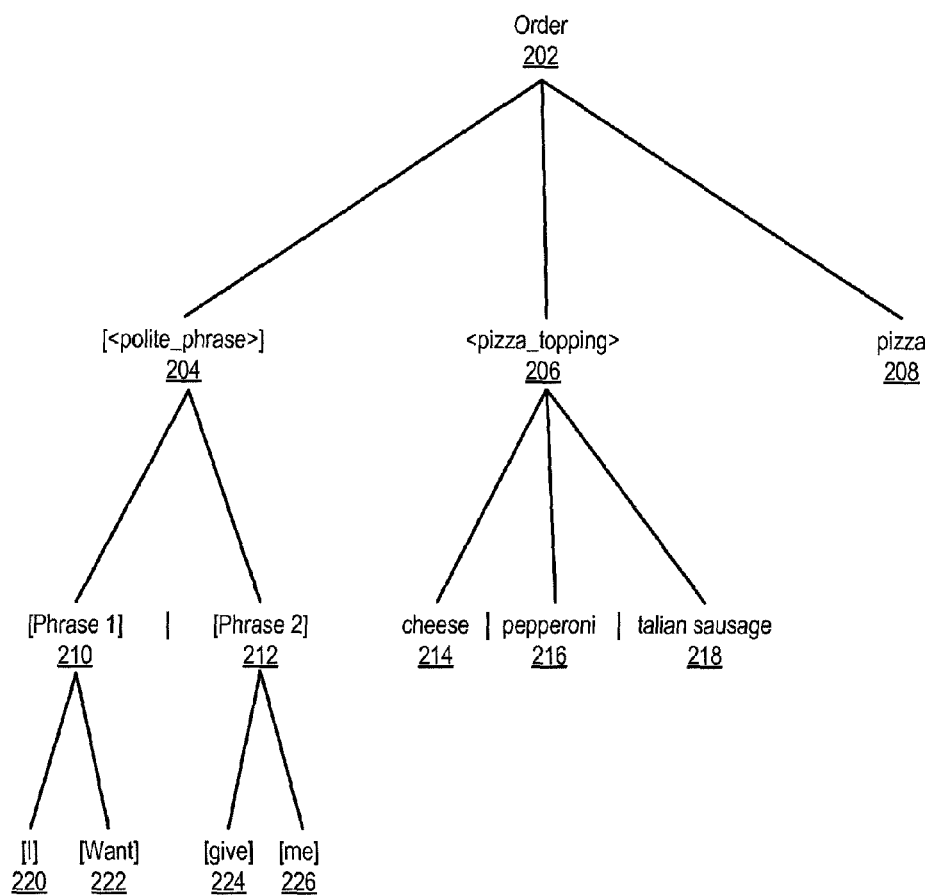
FIG. 2 sets forth a chart illustrating an example speech recognition grammar as a tree structure.

For further explanation of speech recognition grammars, FIG. 2 sets forth a chart illustrating an example speech recognition grammar as a tree structure. The following example is a grammar, useful in indexing digitized speech according to embodiments of the present invention, that supports ordering pizza, with the grammar expressed in Java Speech Grammar Format ('JSGF'):

order=[<polite_phrase>]<pizza_topping>pizza
pizza_topping=cheese|pepperoni|"italian sausage"
polite_phrase=[I][want]|[give][me]

The chart of FIG. 2 maps the elements of the 'order' grammar into a tree structure with the 'order' element (202) at the root of the tree. The terms 'order,' 'pizza_topping,' and 'polite_phrase' specify rules of the grammar. Grammar elements in angled brackets < >, <polite_phrase> (204) and <pizza_topping> (206), are references to rules of the grammar, also called non-terminals, because they represent branch nodes in the tree structure of the grammar that expand into further branch nodes or leaf nodes.

A 'terminal element' is a leaf node in the tree structure of the grammar. 'Pizza' (208) is a non-optional leaf node; if the 'order' grammar is to be matched, the word 'pizza' must be matched with a user utterance. The vertical bars '|' designate grammar elements as alternatives, the use of any one of which will match a grammar element. In the rule <pizza_toppings>, 'cheese' (214), 'pepperoni' (216), and 'italian sausage' (218) are non-optional, alternative terminal elements. If the 'order' grammar is to be matched, the user much speak one of 'cheese,' 'pepperoni,' or 'italian sausage.'

The grammar terms in square brackets [ ] are optional. The square brackets in [<polite_phrase>] designate the 'polite_phrase' rule as an optional, non-terminal element, a branch node in the grammar tree. The terms of the <polite_phrase> (204) rule in square brackets therefore are 'optional terminals,' leaf nodes in the grammar tree which in this example form two optional alternative phrases (210, 212), each of which is composed of two optional alternative terminals or leaf nodes, respectively: [I] (220) [want] (222) and [give] (224) [me] (226).

Indexing digitized speech according to embodiments of the present invention in a thin client architecture may be implemented with one or more voice servers, computers, that is, automated computing machinery, that provide speech recognition and speech synthesis. For further explanation, therefore, FIG. 3 sets forth a block diagram of automated computing machinery comprising an example of a computer useful as a voice server (151) in indexing digitized speech according to embodiments of the present invention. The voice server (151) of FIG. 3 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a voice server application (188), a module of computer program instructions capable of operating a voice server in a system that is configured to carry out automatic speech recognition according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal digital audio editors such as, for example, X+V applications, SALT applications, or Java Speech applications.

The voice server application (188) may be implemented as a web server, implemented in Java, C++, or another language, that supports X+V, SALT, VoiceXML, or other multimodal languages, by providing responses to HTTP requests from X+V clients, SALT clients, Java Speech clients, or other multimodal clients. Voice server application (188) may, for a further example, be implemented as a Java server that runs on a Java Virtual Machine (102) and supports a Java voice framework by providing responses to HTTP requests from Java client applications running on multimodal devices. The voice server application (188) also may be implemented as a VoiceXML service or a SALT service, in which case, the voice server (151) will also include a SALT interpreter (103) or a VoiceXML interpreter. In addition to Java VoiceXML, and SALT, voice server applications that support automatic speech recognition may be implemented in other ways as may occur to those of skill in the art, and all such ways are well within the scope of the present invention.

The voice server (151) in this example includes a speech engine (153). The speech engine is a functional module, typically a software module, although it may include specialized hardware also, that does the work of recognizing and generating human speech. The speech engine (153) includes an automated speech recognition ('ASR') engine (150) for speech recognition and a text-to-speech ('TTS') engine (194) for generating speech. The speech engine also includes a grammar (104), a lexicon (106), and a language-specific acoustic model (108). The language-specific acoustic model (108) is a data structure, a table or database, for example, that associates Speech Feature Vectors ('SFVs') with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The grammar (104) communicates to the ASR engine (150) the words and sequences of words that currently may be recognized. For precise understanding, distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same; the set of words in the grammar typically are a subset of the words in the lexicon.

Grammars for use in indexing digitized speech according to embodiments of the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V <form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog"><![CDATA[
  #JSGF V1.0;
  grammar command;
  <command> = [remind me to] call | phone |
  telephone <name> <when>;
  <name> = bob | martha | joe | pete | chris | john | artoush;
  <when> = today | this afternoon | tomorrow | next week;
  ]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The voice server application (188) in this example is configured to receive, from a multimodal client, such as a multimodal digital audio editor, located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely as multimodal digital audio editors on multimodal devices, from SALT clients running as multimodal digital audio editors on multimodal devices, or from Java client applications running as multimodal digital audio editors remotely on multimedia devices. In this example, VoiceXML interpreter (192) interprets and executes VoiceXML segments representing voice dialog instructions received from remote multimedia devices and provided to VoiceXML interpreter (192) through voice server application (188).

A multimodal digital audio editor (195) in a thin client architecture may provide voice dialog instructions, VoiceXML segments, VoiceXML <form> elements, and the like, to VoiceXML interpreter (149) through data communications across a network with multimodal digital audio editor (195). The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA'). The VoiceXML interpreter interprets VoiceXML dialogs provided to the VoiceXML interpreter by a multimodal digital audio editor.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 3 are shown in RAM (168), but many components of such software typically are stored in non-volatile memory also, for example, on a disk drive (170).

Figure 3:
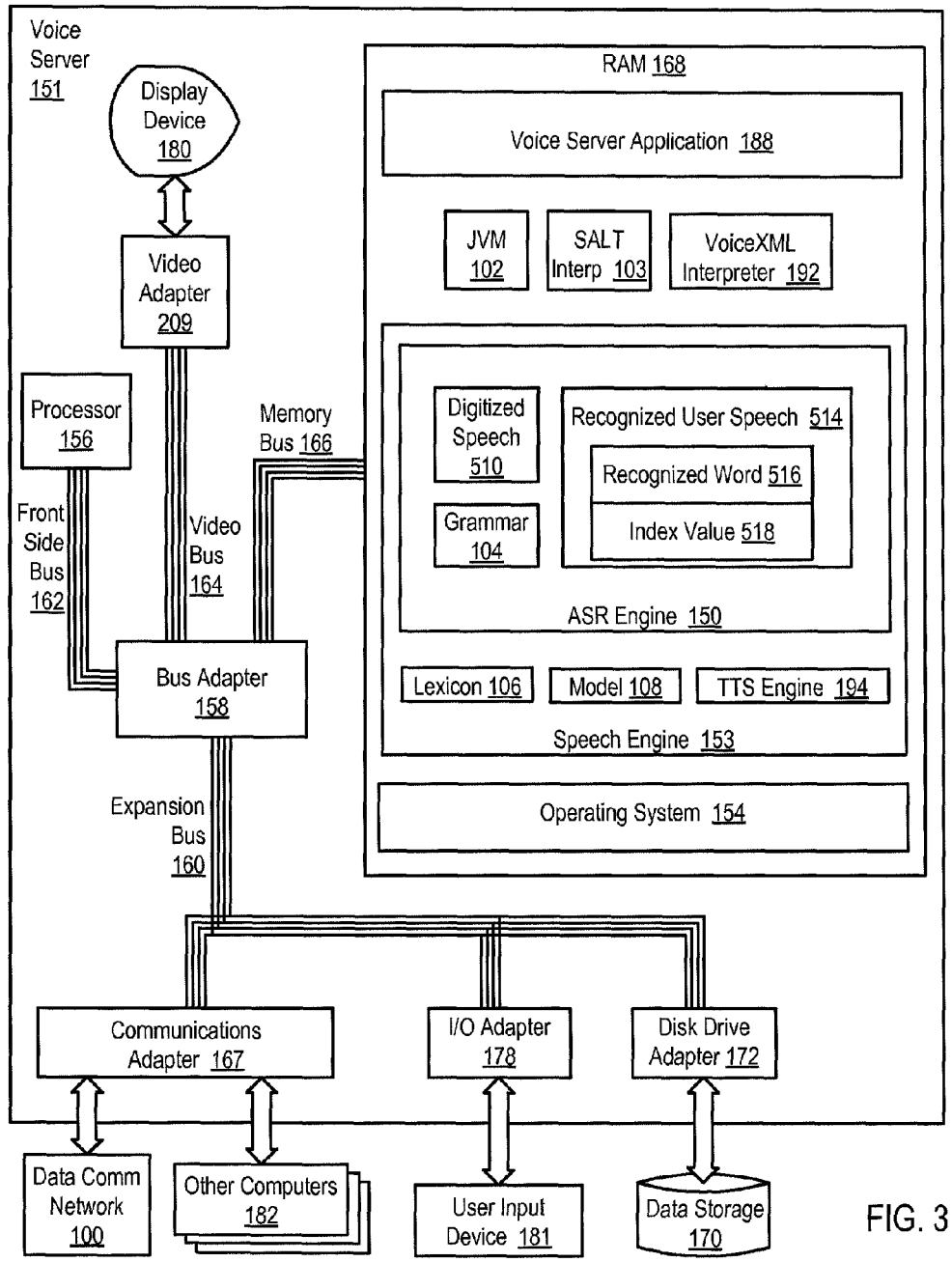
FIG. 3 sets forth a block diagram of automated computing machinery comprising an example of a computer useful as a voice server in indexing digitized speech according to embodiments of the present invention.

Voice server (151) of FIG. 3 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 3 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 3 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 3 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for indexing digitized speech according to embodiments of the present invention include modems for wired dial-up communications, Ethernet (IEEE 802.3) adapters for wired data communications network communications, and 802.11 adapters for wireless data communications network communications.

Figure 4:
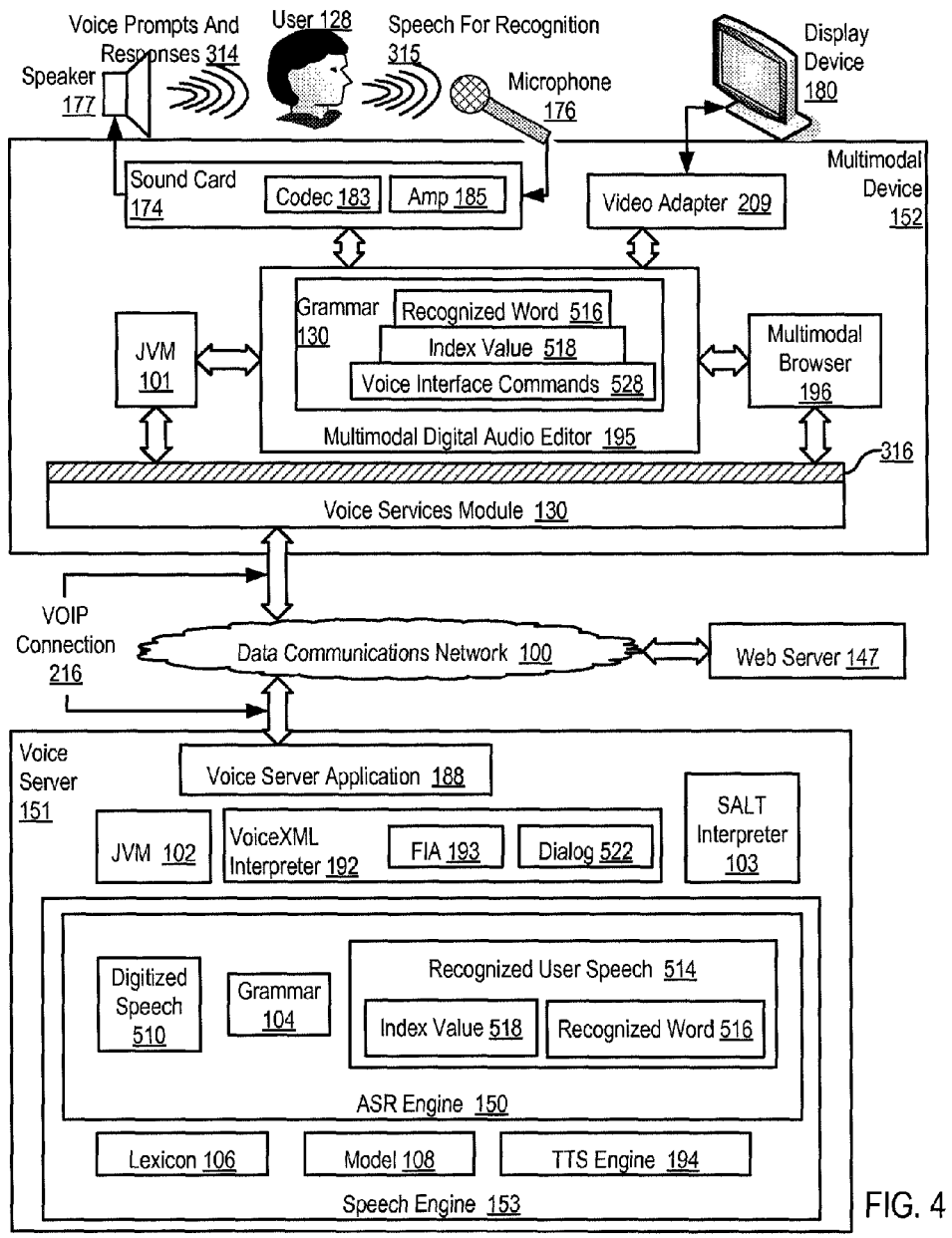
FIG. 4 sets forth a functional block diagram of exemplary apparatus for indexing digitized speech according to embodiments of the present invention.

For further explanation, FIG. 4 sets forth a functional block diagram of exemplary apparatus for indexing digitized speech in a thin client architecture according to embodiments of the present invention. The example of FIG. 4 includes a multimodal device (152) and a voice server (151) connected for data communication by a VOIP connection (216) through a data communications network (100). A multimodal digital audio editor (195) runs on the multimodal device (152), and a voice server application (188) runs on the voice server (151). The multimodal digital audio editor (195) may be a set or sequence of X+V or SALT documents that execute on multimodal browser (196), a Java voice application that executes on the Java Virtual Machine (101), or a multimodal digital audio editor implemented in other technologies as may occur to those of skill in the art. The example multimodal device of FIG. 4 also includes a sound card (174), which is an example of an I/O adapter specially designed for accepting analog audio signals from a microphone (176) and converting the audio analog signals to digital form for further processing by a codec (183).

In addition to the multimodal sever application (188), the voice server (151) also has installed upon it a speech engine (153) with an ASR engine (150), a grammar (104), a lexicon (106), a language-specific acoustic model (108), and a TTS engine (194), as well as a JVM (102), and a Voice XML interpreter (192). VoiceXML interpreter (192) interprets and executes VoiceXML dialog instructions received from the multimodal digital audio editor and provided to VoiceXML interpreter (192) through voice server application (188). VoiceXML input to VoiceXML interpreter (192) may originate from the multimodal digital audio editor (195) implemented as an X+V client running remotely on the multimodal device (152). As noted above, the multimodal digital audio editor (195) also may be implemented as a Java client application running remotely on the multimedia device (152), a SALT application running remotely on the multimedia device (152), and in other ways as may occur to those of skill in the art.

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 4 operates in a manner that is similar to the operation of the system of FIG. 3 described above. Multimodal digital audio editor (195) is a user-level, multimodal, client-side computer program that presents a voice interface to user (128), provides audio prompts and responses (314) and accepts input speech for recognition (315). Multimodal digital audio editor (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal digital audio editor (195) then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts as well as voice prompts. Voice server application (188) includes computer program instructions that provide text-to-speech ('TTS') conversion for voice prompts and voice responses to user input in multimodal digital audio editors such as, for example, X+V applications, SALT applications, or Java Speech applications.

The voice server application (188) receives speech for recognition from a user and passes the speech through API calls to VoiceXML interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

The apparatus of FIG. 4 operates generally to carry out indexing digitized speech according to embodiments of the present invention by providing by the multimodal digital audio editor (195) to an ASR engine (150) digitized speech (510) for recognition. The multimodal digital audio editor (195) receives from the ASR engine (150) recognized user speech (514) including a recognized word (516). The recognized user speech from the ASR engine also includes information (518), referred to in this example as an 'index,' indicating where, in the digitized speech, representation of the recognized word begins. The multimodal digital audio editor (195) inserts the recognized word (516), in association with the information indicating where, in the digitized speech, representation of the recognized word begins, into a speech recognition grammar (130). The speech recognition grammar (130) voice enables user interface commands of the multimodal digital audio editor. Typical digital audio editors according to embodiments of the present invention also visually display the digitized speech with the recognized word as an index of where in the digitized speech the representation of the recognized word begins—as illustrated on FIG. 9 and explained in more detail below with reference to FIGS. 6 and 7.

The ASR engine (150) in this example is improved, not only to return recognized user speech (514) from digitized user speech (510), but, when recognizing a word in the digitized speech, also identifying information (518) indicating where, in the digitized speech, representation of the word begins. The digitized speech is represented by time domain amplitude values, sampled by an analog-to-digital converter from analog speech input from a user, that is, from user utterances, and organized according to a codec in sequential sets grouped frames. Each frame is characterized in sequence by a unique, cardinal frame identification number, and each frame contains the same number of time domain amplitude samples. The ASR engine then can convert the digitized speech (510) containing a word to the frequency domain beginning with one of the frames of time domain amplitude samples—and derive an index value indicating where, in the digitized speech, representation of the word begins by multiplying the one of the frame identification numbers by the number of amplitude samples in each frame. Conversion to the frequency domain may be carried out, for example, by the Fast Fourier Transform ('FFT'). The index value (518) so derived is an example of information indicating where, in the digitized speech, representation of the word begins.

The multimodal digital audio editor (195) is operatively coupled to the ASR engine (150). In this example, the operative coupling between the multimodal digital audio editor and the ASR engine (150) is implemented with a VOIP connection (216) through a voice services module (130), then through the voice server application (188) and either JVM (102), VoiceXML interpreter (192), or SALT interpreter (103), depending on whether the multimodal digital audio editor is implemented in X+V, Java, or SALT. The voice services module (130) is a thin layer of functionality, a module of computer program instructions, that presents an API (316) for use by an application level program in providing dialog instructions and speech for recognition to a voice server application (188) and receiving in response voice prompts and other responses. In this example, application level programs are represented by multimodal digital audio editor (195), JVM (101), and multimodal browser (196).

The voice services module (130) provides data communications services through the VOIP connection and the voice server application (188) between the multimodal device (152) and the VoiceXML interpreter (192). The API (316) is the same API presented to applications by a VoiceXML interpreter when the VoiceXML interpreter is installed on the multimodal device in a thick client architecture (316 on FIG. 5). So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal digital audio editor (195) when the multimodal digital audio editor is implemented with X+V. And calls to the API (316) may be issued from the JVM (101), which provides an execution environment for the multimodal digital audio editor (195) when the multimodal digital audio editor is implemented with Java.

Figure 5:
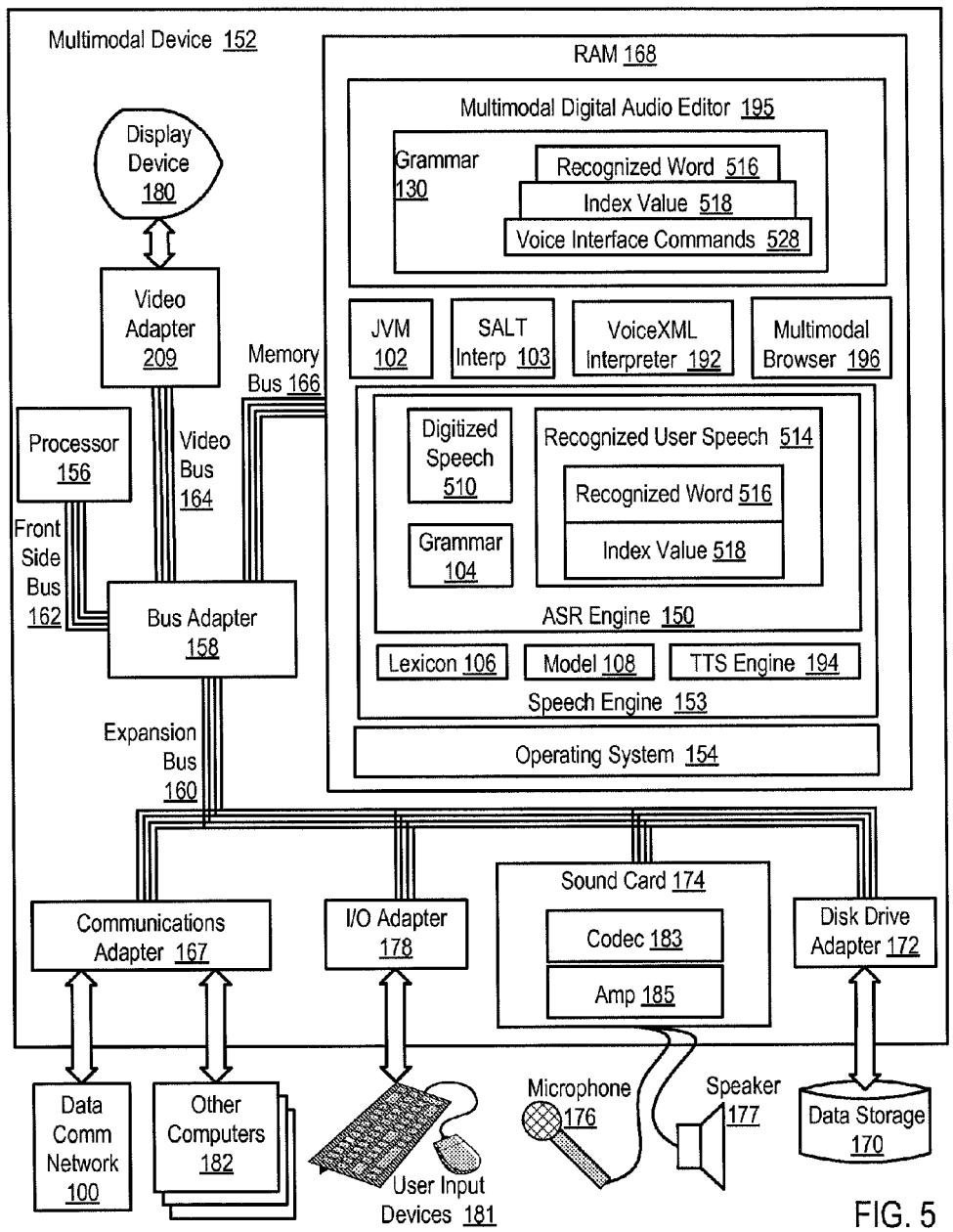
FIG. 5 sets forth a block diagram of automated computing machinery comprising an example of a computer useful as a multimodal device in indexing digitized speech according to embodiments of the present invention.

Indexing digitized speech according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 5 sets forth a block diagram of automated computing machinery comprising an example of a computer useful as a multimodal device (152) in indexing digitized speech according to embodiments of the present invention. In a multimodal device implementing a thick client architecture as illustrated in FIG. 5, the multimodal device (152) has no connection to a remote voice server containing a VoiceXML interpreter and a speech engine. All the components needed for speech synthesis and voice recognition in indexing digitized speech according to embodiments of the present invention are installed or embedded in the multimodal device itself.

The example multimodal device (152) of FIG. 5 includes several components that are structured and operate similarly as do parallel components of the voice server, having the same drawing reference numbers, as described above with reference to FIG. 3: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a JVM (102), a VoiceXML Interpreter (192), a speech engine (153), and so on. As in the system of FIG. 5, the speech engine in the multimodal device of FIG. 3 includes an ASR engine (150), a grammar (104), a lexicon (106), a language-dependent acoustic model (108), and a TTS engine (194). The VoiceXML interpreter (192) administers such dialogs by processing the dialog instructions sequentially in accordance with a VoiceXML Form Interpretation Algorithm ('FIA') (193).

The speech engine (153) in this kind of embodiment, a thick client architecture, often is implemented as an embedded module in a small form factor device such as a handheld device, a mobile phone, PDA, and the like. An example of an embedded speech engine useful for indexing digitized speech according to embodiments of the present invention is IBM's Embedded ViaVoice Enterprise. The example multimodal device of FIG. 5 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal digital audio editor (195), a module of computer program instructions capable of operating a multimodal device as an apparatus that supports indexing digitized speech according to embodiments of the present invention. The multimodal digital audio editor (195) implements speech recognition by accepting speech for recognition from a user and sending the speech for recognition through API calls to the ASR engine (150). The multimodal digital audio editor (195) implements speech synthesis generally by sending words to be used as prompts for a user to the TTS engine (194). As an example of thick client architecture, the multimodal digital audio editor (195) in this example does not send speech for recognition across a network to a voice server for recognition, and the multimodal digital audio editor (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal digital audio editor (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal digital audio editor (195) may be implemented as a set or sequence of X+V documents executing in a multimodal browser (196) or microbrowser that passes VoiceXML grammars and digitized speech by calls through an API (316) directly to an embedded VoiceXML interpreter (192) for processing. The embedded VoiceXML interpreter (192) may in turn issue requests for speech recognition through API calls directly to the embedded ASR engine (150). Multimodal digital audio editor (195) also can provide speech synthesis, TTS conversion, by API calls to the embedded TTS engine (194) for voice prompts and voice responses to user input.

In a further class of exemplary embodiments, the multimodal digital audio editor (195) may be implemented as a Java voice application that executes on Java Virtual Machine (102) and issues calls through the VoiceXML API (316) for speech recognition and speech synthesis services. In further exemplary embodiments, the multimodal digital audio editor (195) may be implemented as a set or sequence of SALT documents executed on a multimodal browser (196) or microbrowser that issues calls through the VoiceXML API (316) for speech recognition and speech synthesis services. In addition to X+V, SALT, and Java implementations, multimodal digital audio editor (195) may be implemented in other technologies as will occur to those of skill in the art, and all such implementations are well within the scope of the present invention.

The multimodal device of FIG. 4 operates generally to carry out indexing digitized speech according to embodiments of the present invention by providing by the multimodal digital audio editor (195) to an ASR engine (150) digitized speech (510) for recognition. The multimodal digital audio editor (195) receives from the ASR engine (150) recognized user speech (514) including a recognized word (516). The recognized user speech from the ASR engine also includes information (518), referred to in this example as an 'index,' indicating where, in the digitized speech, representation of the recognized word begins. The multimodal digital audio editor (195) inserts the recognized word (516), in association with the information indicating where, in the digitized speech, representation of the recognized word begins, into a speech recognition grammar (130). The speech recognition grammar (130) voice enables user interface commands of the multimodal digital audio editor. Typical digital audio editors according to embodiments of the present invention also visually display the digitized speech with the recognized word as an index of where in the digitized speech the representation of the recognized word begins—as illustrated on FIG. 9 and explained in more detail below with reference to FIGS. 6 and 7.

The ASR engine (150) in this example is improved, not only to return recognized user speech (514) from digitized user speech (510), but, when recognizing a word in the digitized speech, also identifying information (518) indicating where, in the digitized speech, representation of the word begins. The digitized speech is represented by time domain amplitude values, sampled by an analog-to-digital converter from analog speech input from a user, that is, from user utterances, and organized according to a codec in sequential sets grouped frames. Each frame is characterized in sequence by a unique, cardinal frame identification number, and each frame contains the same number of time domain amplitude samples. The ASR engine then can convert the digitized speech (510) containing a word to the frequency domain beginning with one of the frames of time domain amplitude samples—and derive an index value indicating where, in the digitized speech, representation of the word begins by multiplying the one of the frame identification numbers by the number of amplitude samples in each frame. Conversion to the frequency domain may be carried out, for example, by the Fast Fourier Transform ('FFT'). The index value (518) so derived is an example of information indicating where, in the digitized speech, representation of the word begins.

The multimodal digital audio editor (195) is operatively coupled to the ASR engine (150). In this example, the operative coupling between the multimodal digital audio editor and the ASR engine (150) is implemented either with JVM (102), VoiceXML interpreter (192), or SALT interpreter (103), depending on whether the multimodal digital audio editor is implemented in X+V, Java, or SALT. When the multimodal digital audio editor (195) is implemented in X+V, the operative coupling is effected through the multimodal browser (196), which provides an operating environment and an interpreter for the X+V application, and then through the VoiceXML interpreter, which passes grammars and voice utterances for recognition to the ASR engine. When the multimodal digital audio editor (195) is implemented in Java Speech, the operative coupling is effected through the JVM (102), which provides an operating environment for the Java application and passes grammars and voice utterances for recognition to the ASR engine. When the multimodal digital audio editor (195) is implemented in SALT, the operative coupling is effected through the SALT interpreter (103), which provides an operating environment and an interpreter for the X+V application and passes grammars and voice utterances for recognition to the ASR engine.

The multimodal digital audio editor (195) in this example, running on a multimodal device (152) that contains its own VoiceXML interpreter (192) and its own speech engine (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal digital audio editor—as well as the functionality for indexing digitized speech with words represented in the digitized speech according to embodiments of the present invention—is implemented on the multimodal device itself.

Figure 6:
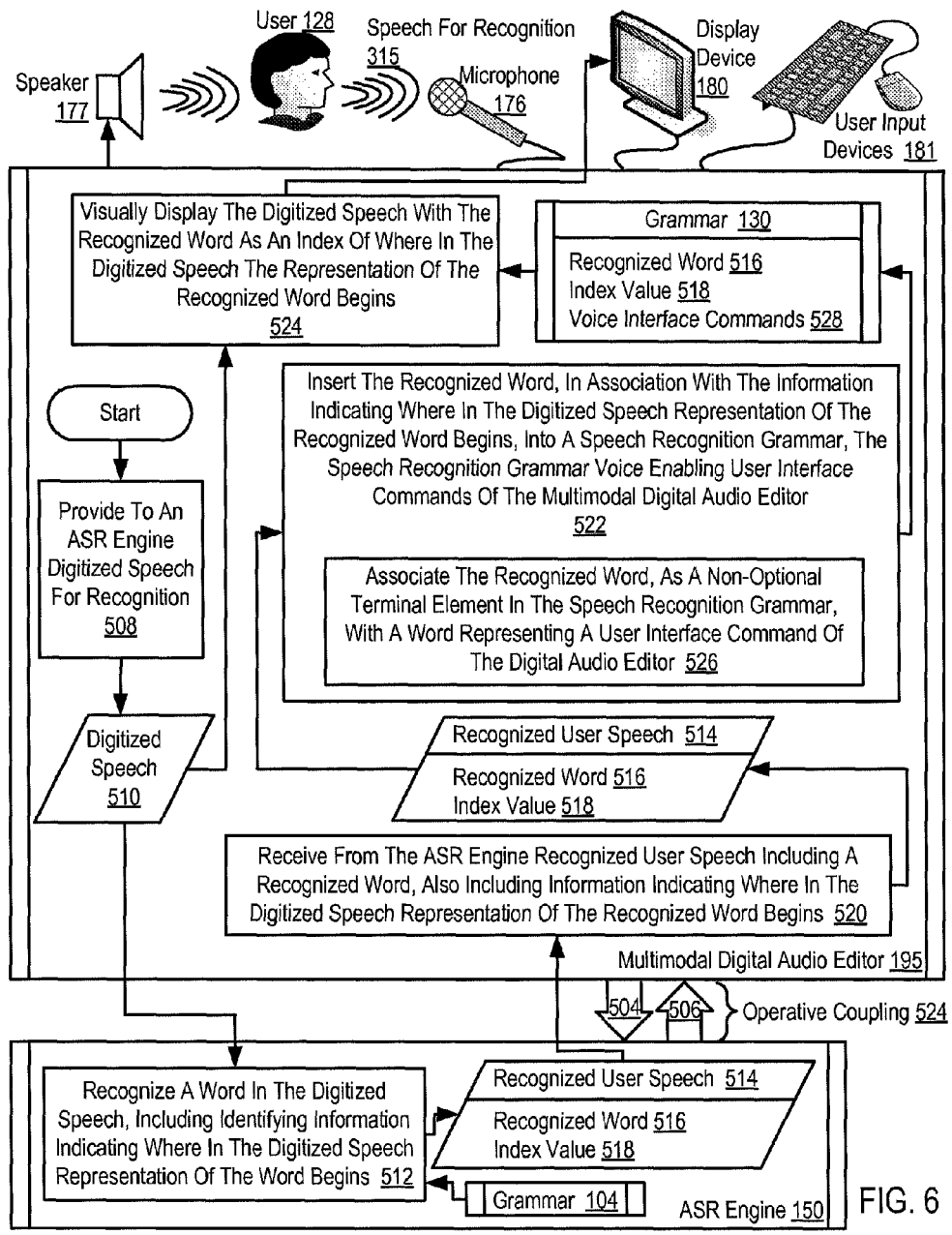
FIG. 6 sets forth a flow chart illustrating an exemplary method of indexing digitized speech according to embodiments of the present invention.

For further explanation, FIG. 6 sets forth a flow chart illustrating an exemplary method of indexing digitized speech according to embodiments of the present invention. Indexing digitized speech in this example is implemented with a multimodal digital audio editor (195). The multimodal digital audio editor (195) operates on a multimodal device (152 on FIG. 1) supporting multiple modes of user interaction with the multimodal digital audio editor including a voice mode and one or more non-voice modes of user interaction with the multimodal digital audio editor. A voice mode of such interaction is represented in this example with audio output through a speaker (177) and audio input through a microphone (176). Non-voice modes are represented by user input devices (180, 181), a visual display device, a keyboard, and a mouse.

The multimodal digital audio editor is operatively coupled (524) to an ASR engine (150). The operative coupling (524) provides a data communications path (504) from the multimodal digital audio editor (195) to the ASR engine for speech recognition grammars. The operative coupling (524) provides a data communications path (506) from the ASR engine (150) to the multimodal digital audio editor (195) for recognized speech and semantic interpretation results. The operative coupling may be effected with a JVM (102 on FIG. 5), VoiceXML interpreter (192 on FIG. 5), or SALT interpreter (103 on FIG. 5), when the multimodal digital audio editor is implemented in a thick client architecture. When the multimodal digital audio editor is implemented in a thin client architecture, the operative coupling may include an a voice services module (130 on FIG. 4) and a VOIP connection (216 on FIG. 4). When multimodal digital audio editor is implemented in X+V, the operative coupling may include a VoiceXML interpreter (192 on FIG. 4). When the multimodal digital audio editor is implemented in a Java speech framework, the operative coupling may include a Java speech API and a JVM (101, 102 on FIG. 4). When the multimodal digital audio editor is implemented in SALT, the operative coupling may include a SALT interpreter (103 on FIG. 4).

The method of FIG. 6 includes providing (508) by the multimodal digital audio editor (195) to the ASR engine (150) digitized speech (510) for recognition. The digitized speech may be a stream currently input by a user through an analog-to-digital converter and a codec on a sound card or a previously recorded digital audio clip, for example. The multimodal digital audio editor (195) also provides to the ASR engine (150) a speech recognition grammar (104) that identifies to the ASR engine words in the digitized speech that are presently eligible for recognition.

In the method of FIG. 6, the ASR engine recognizes (512) a word (516) in the digitized speech, and the ASR engine also identifies information indicating where, in the digitized speech, representation of the word begins. As explained in more detail below, the ASR engine can use a frame number and the number of amplitude samples in each frame to calculate an index indicating where, in the digitized speech, representation of the word begins. Such an index may be implemented therefore as the actual sequence number of a particular digital amplitude sample in the digitized speech where representation a recognized word begins in the digitized speech, such as, for example: 167243, 298374, or 314325. The ASR engine returns to the multimodal digital audio editor (195) recognized user speech (514), including the recognized word (516) and an index value (518) as the information indicating where, in the digitized speech, representation of the word begins. The multimodal digital audio editor (195) receives (520) from the ASR engine (150) the recognized user speech (514) including the recognized word (516), and also including the information (518) indicating where, in the digitized speech, representation of the recognized word begins.

The method of FIG. 6 also includes inserting (522) by the multimodal digital audio editor the recognized word (516), in association with the information (518) indicating where, in the digitized speech, representation of the recognized word begins, into a speech recognition grammar (130), the speech recognition grammar voice enabling user interface commands (528) of the multimodal digital audio editor. User interface commands so voice enabled may include, for example, Play, Pause, Stop, Rewind, Zoom, and so on. In the method of FIG. 6, inserting (522) the word into a speech recognition grammar includes associating (526) the recognized word, as a non-optional terminal element in the speech recognition grammar, with a word representing a user interface command of the digital audio editor. Here is an example of a speech recognition grammar bearing non-optional terminal elements associated with words representing user interface commands of a multimodal digital audio editor:

```
instruction = $command $word [to] [$word]
command = play [from] | show | zoom | ...
word = car {$.index=167243} | bomb {$.index=298374} | airplane
    {$.index=314325} | ...
```

In this example grammar, the words "car," "bomb," and "airplane" are words recognized by an ASR engine and inserted by a multimodal digital audio editor into a speech recognition grammar, as non-optional terminal grammar elements, in association with the following words representing user interface commands of the multimodal digital audio editor: "play" and "show." In this example, moreover, the multimodal digital audio editor has inserted, as parts of a non-optional terminal grammar element, information indicating where, in digitized speech, representation of each recognized word begins, respectively, in this example, as digital sample sequence numbers 167243, 298374, and 314325. These sequence numbers or indices in this example are associated with the recognized words "car," "bomb," and "airplane" in semantic interpretation scripts, so that when the words "car," "bomb," and "airplane" are subsequently recognized as part of user interface commands, the value of the semantic interpretation script, that is, the index into the digitized speech where representation of the word begins is returned by an ASR engine as part of the recognition results—advising the multimodal digital audio editor how to associate a recognized word with a particular location in playback, editing, or display of the digitized speech.

The method of FIG. 6 also includes visually displaying (524) the digitized speech with the recognized word as an index of where in the digitized speech the representation of the recognized word begins. Visual display of the digitized speech is explained below with reference to FIG. 9.

Figure 7:
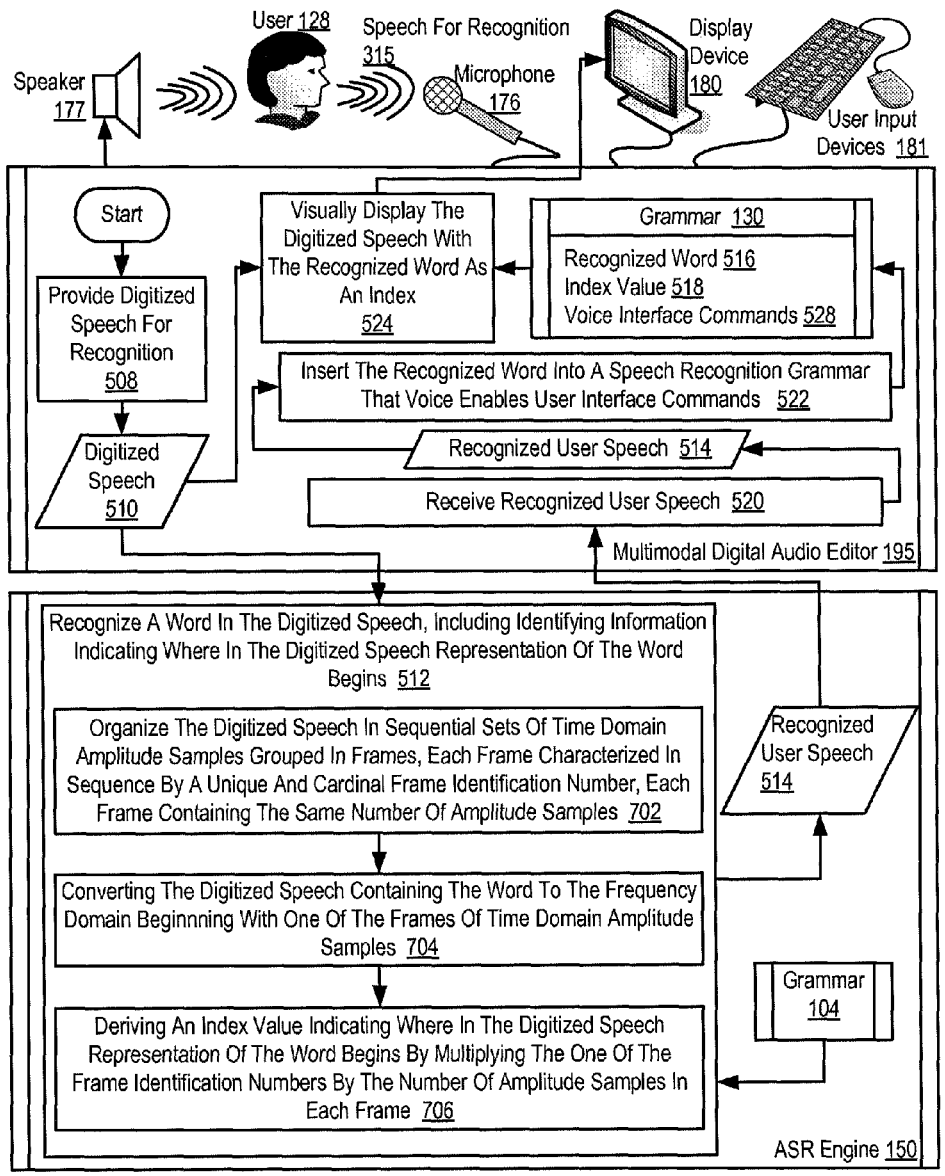
FIG. 7 sets forth a flow chart illustrating a further exemplary method of indexing digitized speech according to embodiments of the present invention.

For further explanation, FIG. 7 sets forth a flow chart illustrating a further exemplary method of indexing digital speech according to embodiments of the present invention. The method of FIG. 7 is similar to the method of FIG. 6, including as it does providing (508) digitized speech for recognition, receiving (520) recognized user speech including a recognized word and information indicating where, in the digitized speech, representation of the recognized word begins, and inserting (522) the recognized word with information indicating where representation of the recognized word begins, into a speech recognition grammar that voice enables user interface commands, all of which function in a manner similar to that described above with reference to the method of FIG. 6. In the method of FIG. 7, however, identifying (512) the information indicating where, in the digitized speech, representation of the word begins includes organizing (702) the digitized speech in sequential sets of time domain amplitude samples grouped in frames, each frame characterized in sequence by a unique and cardinal frame identification number, each frame containing the same number of time domain amplitude samples. The organizing (702) step is shown for convenience of explanation as occurring in the ASR engine. Readers will recognize, however, that such organizing also may be carried out as part of a codec function on a sound card, and in other ways as may occur to those of skill in the art.

Also in the method of FIG. 7, identifying (512) the information indicating where, in the digitized speech, representation of the word begins includes converting (704) the digitized speech containing the word to the frequency domain beginning with one of the frames of time domain amplitude samples. Moreover in the method of FIG. 7, identifying (512) the information indicating where, in the digitized speech, representation of the word begins also includes deriving an index value indicating where, in the digitized speech, representation of the word begins by multiplying the one of the frame identification numbers by the number of amplitude samples in each frame. The digitized speech is composed of time-domain digital amplitude samples.

The ASR engine may, for example, convert time-domain digital amplitude samples to the frequency domain by Fast Fourier Transform ('FFT') on a set of several amplitudes in a frame identified by a frame number, where the frame numbers are cardinals that uniquely identify each frame. The frame number is a time-domain entity, so the location in the digitized speech of a recognized word is specified as a cardinal sample number by multiplying the frame number by the number of amplitude samples in each frame. Because of its function as an indicator of location, that is, the location where, in the digitized speech, representation of a recognized word begins, such a cardinal sample number is sometimes referred to in this specification as an "index" or "index value."

Figure 8:
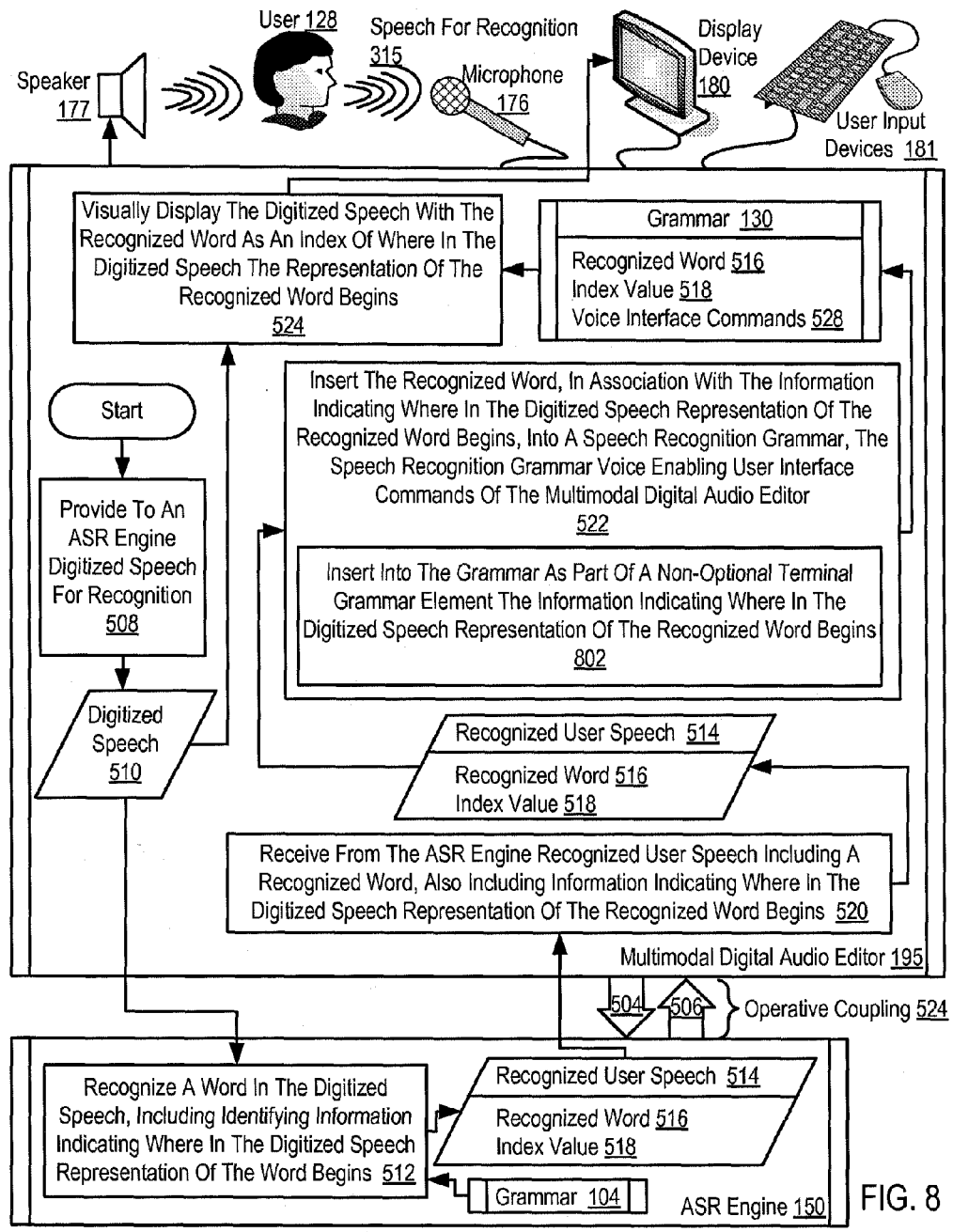
FIG. 8 sets forth a flow chart illustrating a further exemplary method of indexing digitized speech according to embodiments of the present invention.

For further explanation, FIG. 8 sets forth a flow chart illustrating a further exemplary method of indexing digital speech according to embodiments of the present invention providing (508) digitized speech for recognition, receiving (520) recognized user speech including a recognized word and information indicating where, in the digitized speech, representation of the recognized word begins, and inserting (522) the recognized word with information indicating where representation of the recognized word begins, into a speech recognition grammar that voice enables user interface commands, all of which function in a manner similar to that described above with reference to the method of FIG. 6. In the method of FIG. 8, however, the speech recognition grammar voice enabling (522) user interface commands of the multimodal digital audio editor includes inserting (802) by the multimodal digital audio editor into the grammar as part of a non-optional terminal grammar element the information indicating where, in the digitized speech, representation of the recognized word begins. Here is an example of a speech recognition grammar bearing non-optional terminal elements containing information indicating where, in digitized speech, representation of recognized words begin:
instruction=$command $word [to][$word]
command=play [from]|show|zoom| . . . .
word=car {$.index=167243}|bomb {$.index=298374}|airplane {$.index=314325}| . . . .

In this example grammar, the words "car," "bomb," and "airplane" are words recognized by an ASR engine and inserted by a multimodal digital audio editor into a speech recognition grammar, as non-optional terminal grammar elements, in association with the following words representing user interface commands of the multimodal digital audio editor: "play" and "show." In this example, moreover, the multimodal digital audio editor has inserted, as parts of a non-optional terminal grammar element, information indicating where, in digitized speech, representation of each recognized word begins, respectively, in this example, as digital sample sequence numbers 167243, 298374, and 314325. These sequence numbers or indices in this example are associated with the recognized words "car," "bomb," and "airplane" in semantic interpretation scripts, so that when the words "car," "bomb," and "airplane" are subsequently recognized as part of user interface commands, the value of the semantic interpretation script, that is, the index into the digitized speech where representation of the word begins is returned by an ASR engine as part of the recognition results—advising the multimodal digital audio editor how to associated a recognized word with a particular location in playback, editing, or display of the digitized speech. Without the indices in the grammar, the multimodal digital audio editor would need to use the recognized word to look up the index in a table or other data structure, a much more laborious procedure than including the index in the grammar and in the recognition results.

Figure 9:
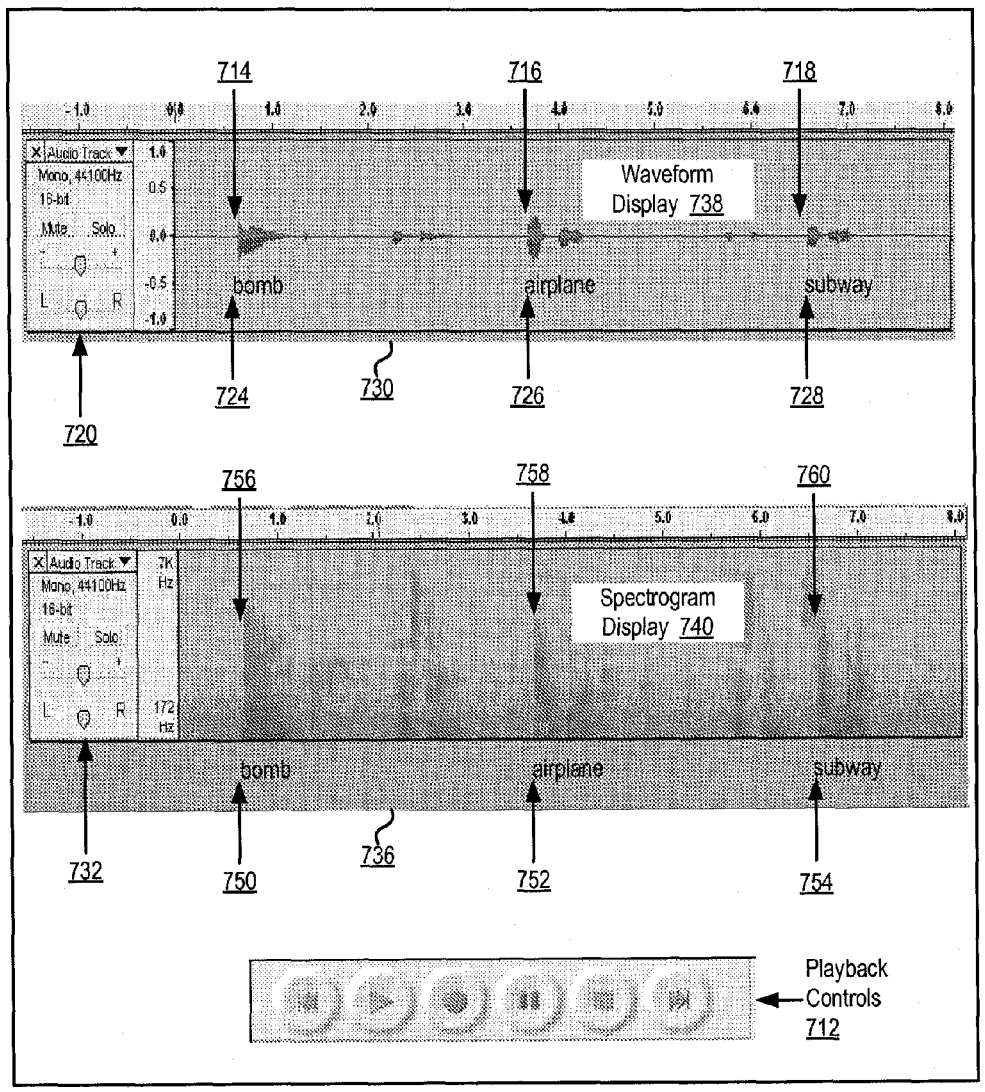
FIG. 9 sets forth a drawing of an exemplary graphical user interface ('GUI') display of a multimodal digital audio editor that indexes digitized speech with words represented in digitized speech according to embodiments of the present invention.

For further explanation, FIG. 9 sets forth a drawing of an exemplary graphical user interface ('GUI') display of a multimodal digital audio editor that indexes digitized speech with words represented in the digitized speech according to embodiments of the present invention. In the example of FIG. 9, the multimodal digital audio editor has provided to an ASR engine digitized speech for recognition, a recorded MP3 clip for example, along with a speech recognition grammar that enabled recognition of the words "airplane," "bomb," "car," "subway," "explode," and "attack." The ASR engine recognized the words "bomb," "airplane," and "subway," and returned to the multimodal digital audio editor recognition results that included the recognized words along with information indicating where, in the digitized speech, representation of each recognized word begins. The digitized speech comprises digital amplitude sample values organized in sequentially-numbered frames. The information indicating where, in the digitized speech, representation of each recognized word begins is represented by a sequential, time-domain digital amplitude sample number ('index value') calculated by the ASR engine with a frame number of the frame where the word is found in the digitized speech and the number of samples per frame.

The multimodal digital audio editor, having received the recognized words and their index values, inserted each recognized word, in association its index value into a speech recognition grammar that voice enables user interface commands of the multimodal digital audio editor, such as, this example grammar:
instruction=$command $word [to][$word]
command=play [from]|show|zoom| . . . .
word=bomb {$.index=167243}|airplane {$.index=298374}|subway {$.index=314325} . . . .

The example grammar enables the multimodal digital audio editor to accept and carry out voice commands such as, for example:
    "Zoom in on bomb,"
    "Show airplane," and
    "Play from bomb to subway."

In addition to voice control, the example GUI of FIG. 9 also includes visual controls for manipulation by keyboard, a mouse, or other user interface tools. Such visual controls include the GUI playback controls (712) for user interface commands such as, for example, Rewind, Play, Pause, Stop, Fast Forward, and so on, as well as visual controls (720, 732) for display of the digitized speech.

The example GUI display of FIG. 9 also includes two visual displays (738, 740) of digitized speech with recognized words as an index of where in the digitized speech the representation of each recognized word begins: a waveform display (738) and a spectrogram display (740). The horizontal axis of the waveform display (738) represents time and the vertical axis represents waveform amplitude. The words "bomb," "airplane," and "subway," are visually displayed (724, 726, 728) on the waveform display (738) as indices of where in the digitized speech the representation of each recognized word begins, with the left edge of "bomb" (724) aligned as an index with sample number 167243 (714), the left edge of "airplane" (726) aligned as an index with sample number 298374 (716), and the left edge of "subway" (724) aligned as an index with sample number 314325 (718).

The horizontal axis of the spectrogram display (740) represents time and the vertical axis represents frequency. Amplitude or sound intensity is indicated on the spectrogram display with color or with intensity on a gray scale, for example. The words "bomb," "airplane," and "subway," are visually displayed (750, 752, 754) on the spectrogram display (740) as indices of where in the digitized speech the representation of each recognized word begins, with the left edge of "bomb" (750) aligned as an index with sample number 167243 (756), the left edge of "airplane" (752) aligned as an index with sample number 298374 (758), and the left edge of "subway" (754) aligned as an index with sample number 314325 (760).

In view of the explanations set forth above, readers will now recognized that the benefits of indexing digitized speech with words represented in the digitized speech according to embodiments of the present invention include greatly easing the process of analyzing human speech with a digital audio editor when the analyst is interest in locations of particular words in the audio data. A typical multimodal digital audio editor according to embodiments of the present invention, among other benefits that will occur to those of skill in the art, effectively combines recognized text with audio data so that the audio editor can annotate a graphical display of the audio data with the recognized words and enable manipulation of the display with voice commands.

Exemplary embodiments of the present invention are described largely in the context of a fully functional computer system for indexing digitized speech with words represented in the digitized speech. Readers of skill in the art will recognize, however, that the present invention also may be embodied in a computer program product disposed on computer-readable signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for use with a multimodal digital audio editor operating on a multimodal device supporting multiple modes of user interaction with the multimodal digital audio editor, the modes of user interaction including a voice mode and one or more non-voice modes, the multimodal digital audio editor operatively coupled to an automatic speech recognition (ASR) engine, the method comprising:

receiving in the multimodal digital audio editor, recognized speech that the ASR engine generated from digitized speech, that includes a recognized word and information indicating where, in the digitized speech, representation of the recognized word appears;

inserting, by the multimodal digital audio editor, the recognized word into a speech recognition grammar; and inserting, by the multimodal digital audio editor, into the speech recognition grammar in association with the recognized word, the information indicating where, in the digitized speech, representation of the recognized word appears.

2. The method of claim 1, further comprising visually displaying the digitized speech with the recognized word as an index of where in the digitized speech the representation of the recognized word appears.

3. The method of claim 1, further comprising recognizing, by the ASR engine, the recognized word in the digitized speech and identifying information indicating where, in the digitized speech, representation of the recognized word appears.

4. The method of claim 3, wherein identifying the information indicating where, in the digitized speech, representation of the recognized word appears further comprises:

organizing the digitized speech in sequential sets of time domain amplitude samples grouped in frames, each frame characterized in sequence by a unique and cardinal frame identification number, each frame containing the same number of time domain amplitude samples;

converting the digitized speech containing the recognized word to the frequency domain beginning with one of the frames of time domain amplitude samples; and deriving an index value indicating where, in the digitized speech, representation of the recognized word appears by multiplying the one of the frame identification numbers by the number of amplitude samples in each frame.

5. The method of claim 1, wherein inserting the recognized word into a speech recognition grammar further comprises associating the recognized word, as a non-optional terminal element in the speech recognition grammar, with a word representing a user interface command of the digital audio editor.

6. The method of claim 1, wherein the inserting the information indicating where, in the digitized speech, representation of the recognized word appears comprises inserting the information as part of a non-optional terminal grammar element.

7. Apparatus for use with a multimodal digital audio editor operating on a multimodal device supporting multiple modes of user interaction with the multimodal digital audio editor, the modes of user interaction including a voice mode and one or more non-voice modes, the multimodal digital audio editor being operatively coupled to an automatic speech recognition (ASR) engine, the apparatus comprising:
 at least one computer processor; and
 a computer memory operatively coupled to the at least one computer processor,
 the at least one computer processor being programmed to:
  receive, in the multimodal digital audio editor, recognized speech that the ASR engine generated from digitized speech, that includes a recognized word and information indicating where, in the digitized speech, representation of the recognized word appears;
  insert, by the multimodal digital audio editor, the recognized word into a speech recognition grammar; and
  insert, by the multimodal digital audio editor, into the speech recognition grammar in association with the recognized word, the information indicating where, in the digitized speech, representation of the recognized word appears.

8. The apparatus of claim 7, wherein the at least one computer processor is programmed to visually display the digitized speech with the recognized word as an index of where in the digitized speech the representation of the recognized word appears.

9. The apparatus of claim 7, wherein the at least one computer processor is programmed to recognize, by the ASR engine, the recognized word in the digitized speech and identify information indicating where, in the digitized speech, representation of the recognized word appears.

10. The apparatus of claim 9, wherein identifying the information indicating where, in the digitized speech, representation of the recognized word appears further comprises:
 organizing the digitized speech in sequential sets of time domain amplitude samples grouped in frames, each frame characterized in sequence by a unique and cardinal frame identification number, each frame containing the same number of time domain amplitude samples;
 converting the digitized speech containing the recognized word to the frequency domain beginning with one of the frames of time domain amplitude samples; and
 deriving an index value indicating where, in the digitized speech, representation of the recognized word appears by multiplying the one of the frame identification numbers by the number of amplitude samples in each frame.

11. The apparatus of claim 7, wherein the at least one computer processor is programmed to insert the word into a speech recognition grammar by associating the recognized word, as a non-optional terminal element in the speech recognition grammar, with a word representing a user interface command of the digital audio editor.

12. The apparatus of claim 7, wherein the at least one computer processor is programmed to insert, into the grammar as part of a non-optional terminal grammar element, the information indicating where, in the digitized speech, representation of the recognized word appears.

13. A computer-readable, recordable medium having instructions encoded thereon which, when executed in a system comprising a multimodal digital audio editor operating on a multimodal device supporting multiple modes of user interaction with the multimodal digital audio editor, the modes of user interaction including a voice mode and one or more non-voice modes, the multimodal digital audio editor being operatively coupled to an automatic speech recognition (ASR) engine, perform a method comprising:
 receiving, in the multimodal digital audio editor, recognized speech that the ASR engine generated from digitized speech, that includes a recognized word and information indicating where, in the digitized speech, representation of the recognized word appears;
 inserting, by the multimodal digital audio editor, the recognized word into a speech recognition grammar; and
 inserting, by the multimodal digital audio editor, into the speech recognition grammar in association with the recognized word, the information indicating where, in the digitized speech, representation of the recognized word appears.

14. The computer-readable, recordable medium of claim 13, wherein the method further comprises visually displaying the digitized speech with the recognized word as an index of where in the digitized speech the representation of the recognized word appears.

15. The computer-readable, recordable medium of claim 13, wherein the method further comprises recognizing, by the ASR engine, the recognized word in the digitized speech and identifying information indicating where, in the digitized speech, representation of the recognized word appears.

16. The computer-readable, recordable medium of claim 15, wherein identifying the information indicating where, in the digitized speech, representation of the recognized word appears further comprises:
 organizing the digitized speech in sequential sets of time domain amplitude samples grouped in frames, each frame characterized in sequence by a unique and cardinal frame identification number, each frame containing the same number of time domain amplitude samples;
 converting the digitized speech containing the recognized word to the frequency domain beginning with one of the frames of time domain amplitude samples; and
 deriving an index value indicating where, in the digitized speech, representation of the recognized word appears by multiplying the one of the frame identification numbers by the number of amplitude samples in each frame.

17. The computer-readable, recordable medium of claim 13, wherein inserting the recognized word into a speech recognition grammar further comprises associating the recognized word, as a non-optional terminal element in the speech recognition grammar, with a word representing a user interface command of the digital audio editor.

18. The computer-readable, recordable medium of claim 13, wherein the inserting the information indicating where, in the digitized speech, representation of the recognized word appears comprises inserting the information as part of a non-optional terminal grammar element.

* * * * *